United States Patent
Hirashige et al.

(10) Patent No.: US 8,163,438 B2
(45) Date of Patent: Apr. 24, 2012

(54) COMPOSITE ELECTROLYTE MEMBRANE, PRODUCTION METHOD THEREOF, MEMBRANE-ELECTRODE ASSEMBLY, AND FUEL CELL

(75) Inventors: Takayuki Hirashige, Hitachi (JP);
Makoto Morishima, Hitachinaka (JP);
Mikio Kishimoto, Moriya (JP); Yuko Sawaki, Takatsuki (JP); Kazutaka Matsuo, Oyamazaki (JP)

(73) Assignee: Hitachi, Ltd., Tokyo (JP)

( * ) Notice: Subject to any disclaimer, the term of this patent is extended or adjusted under 35 U.S.C. 154(b) by 846 days.

(21) Appl. No.: 12/155,142

(22) Filed: May 30, 2008

(65) Prior Publication Data

US 2008/0318107 A1 Dec. 25, 2008

(30) Foreign Application Priority Data

May 30, 2007 (JP) .................................. 2007-143596

(51) Int. Cl.
*H01M 8/10* (2006.01)
*C01G 25/02* (2006.01)

(52) U.S. Cl. .................... 429/491; 429/496; 423/608

(58) Field of Classification Search .............. 429/491, 429/495, 492, 496; 423/617, 608
See application file for complete search history.

(56) References Cited

U.S. PATENT DOCUMENTS

| | | | |
|---|---|---|---|
| 6,417,320 B1 * | 7/2002 | Otto et al. ................... 528/279 |
| 7,030,206 B2 * | 4/2006 | Kanaoka et al. .......... 429/494 X |
| 7,582,373 B2 | 9/2009 | Shirono et al. |
| 2005/0031924 A1 * | 2/2005 | Shirono et al. ................ 429/30 |
| 2005/0106469 A1 * | 5/2005 | Kawai et al. .............. 429/30 X |
| 2006/0008688 A1 | 1/2006 | Kamo et al. |
| 2006/0057448 A1 * | 3/2006 | Miyauchi et al. .............. 429/30 |
| 2009/0291348 A1 | 11/2009 | Hirashige et al. |

FOREIGN PATENT DOCUMENTS

| | | |
|---|---|---|
| JP | 2003-151583 | 5/2003 |
| JP | 2003-331869 | 11/2003 |
| WO | WO 00/54351 | 9/2000 |
| WO | WO 2006/064542 | 6/2006 |

OTHER PUBLICATIONS

L. Li et al., Novel Proton Conducting Composite Membranes for Direct Methanol Furl Cell, Materials Letters 57 (2003) pp. 1406-1410.
Brett Libby et al., Polymer-Zeolite Composite Membranes for Direct Methanol Fuel Cells, AICHE Journal Apr. 2003, vol. 49, No. 4 pp. 991-1001.
S.P.Nunes et al., Inorganic Modification of Proton Conductive Polymer Membranes for Direct Methanol Fuel Cells, Journal of Membrane Science 203 (2003) pp. 215-225.
Chinese office action dated Sep. 18, 2009 with partial translation.
Korean office action dated Nov. 23, 2009 and partial translation.

* cited by examiner

*Primary Examiner* — Stephen J. Kalafut
(74) *Attorney, Agent, or Firm* — Antonelli, Terry, Stout & Kraus, LLP.

(57) ABSTRACT

A composite electrolyte membrane uses a metal-oxide hydrate which has a number of hydration water molecules of 2.7 or more and 10 or less and/or which is in the form of particles having a particle diameter of 1 nm or more and 10 nm or less. The composite electrolyte membrane exhibits its expected original performance, has both a high proton conductivity and a low methanol permeability, and provides a high-output membrane electrolyte assembly for a fuel cell.

8 Claims, 4 Drawing Sheets

COMPOSITE ELECTROLYTE MEMBRANE, PRODUCTION METHOD THEREOF, MEMBRANE-ELECTRODE ASSEMBLY, AND FUEL CELL

CLAIM OF PRIORITY

The present application claims priority from Japanese Patent application serial no. 2007-143596, filed on May 30, 2007, the contents of which are hereby incorporated by references into this application.

FIELD OF THE INVENTION

The present invention relates to electrolyte membranes for use in fuel cells, and production method thereof. It also relates to membrane electrode assemblies each including an electrolyte membrane integrated with catalyst electrodes; direct methanol fuel cells (DMFCs); and polymer electrolyte fuel cells (PEFCs).

BACKGROUND OF THE INVENTION

Direct methanol fuel cells (DMFCs) using methanol as a fuel have been expected and increasingly developed for practical use as power sources for portable units, as a substitute for lithium ion secondary batteries.

Such DMFCs structurally include a cathode catalyst layer and an anode catalyst layer as electrodes; and a proton conductive solid polymer electrolyte membrane (proton-exchange membrane) is disposed between the cathode catalyst layer and the anode catalyst layer. This structure is known as a membrane electrode assembly (MEA). The cathode catalyst layer and anode catalyst layer each have a matrix containing a catalyst-supporting carbon and a solid polymer electrolyte in a suitable ratio, in which electrode reactions occur at a three-phase interface where the catalyst on the carbon, the solid polymer electrolyte, and a reactant are in contact with one another. The continuous carbon provides an electron transport path, and the continuous solid polymer electrolyte provides a proton transport path.

In DMFCs, reactions represented by following Schemes (1) and (2) occur in the anode catalyst layer and cathode catalyst layer, respectively, to deliver electricity.

$$CH_3OH + H_2O \rightarrow CO_2 + 6H^+ + 6e^- \quad (1)$$

$$O_2 + 4H^+ + 4e^- \rightarrow 2H_2O \quad (2)$$

DMFCs are believed to theoretically have energy densities about 10 times as much as those of lithium ion secondary batteries. Under present circumstances, however, their MEAs show still insufficient output as compared to lithium ion secondary batteries and have not yet been practically used.

To improve the output of MEAs, for example, the component catalysts and electrolyte membrane may be improved and/or the MEA structure may be optimized. Among them, improvements in electrolyte membrane is important to improve the output of MEAs effectively.

The electrolyte membrane is required to have a high proton conductivity and a low methanol permeability.

The high proton conductivity provides a low resistance in the electrolyte membrane, and the low methanol permeability prevents "crossover" in which methanol in the anode permeates through the electrolyte membrane and reaches the cathode. Methanol after reaching the cathode chemically reacts with oxygen on the cathode catalyst and generates heat. The crossover phenomenon causes increase of overvoltage in the cathode, resulting in decreased output of MEA.

The most popular electrolyte membrane now available is a perfluorosulfonic acid membrane supplied by DuPont under the trade name of Nafion (registered trademark). Nafion has a hydrophobic PTFE backbone and side chains including fixed terminal hydrophilic sulfonic acid groups. In a hydrous state, sulfonic acid groups, protons, and water molecules associate to form ion clusters. In the ion clusters, sulfonic acid groups are present in a high concentration so as to provide a proton transfer path, leading to a high proton conductivity. These ion clusters, however, also allow methanol to transfer therethrough, because methanol is miscible with water and movable with water. This causes a high methanol permeability. As is described above, Nafion is disadvantageous in its high methanol permeability, in spite of its high proton conductivity.

Examples of electrolyte membranes other than Nafion are hydrocarbon-based membranes and aromatic hydrocarbon membranes, each of which has a proton donor such as sulfonic acid group, phosphonic acid group, or carboxyl group. These electrolyte membranes exhibit their proton conductivity in a hydrous state so as to release protons, as in Nafion. It is possible to increase the proton conductivity by increasing the concentration of the proton donor such as sulfonic acid group. However, such a high concentration of the proton donor such as sulfonic acid group causes easy movement of water, and this in turn causes a higher methanol permeability.

As is described above, there is a trade-off between proton conductivity and methanol permeability in single organic polymer electrolyte membranes, and it has been difficult to provide electrolyte membranes having both a high proton conductivity and a low methanol permeability.

As a candidate for electrolyte membranes having both a high proton conductivity and a low methanol permeability, there have been received attention inorganic/organic composite electrolyte membranes including an inorganic material and an organic material as a composite. Typically, Materials Letters, 57 1406 (2003) refers to a composite electrolyte membrane that contains a polyvinyl alcohol as an organic material, and 12-tungstophosphoric acid, one of heteropolyacids, as an inorganic material dispersed in the polyvinyl alcohol. AIChE Journal, 49 991 (2003) refers to a composite electrolyte membrane which includes a polyvinyl alcohol as an organic material, and mordenite, one kind of zeolite, as an inorganic material dispersed in the polyvinyl alcohol. J. Membrane Science, 203 215 (2002) refers to a composite electrolyte membrane which includes a sulfonated polyether ketone or sulfonated polyether ether ketone as an organic material, and $SiO_2$, $TiO_2$, or $ZrO_2$ as an inorganic material dispersed in the organic material.

Japanese Unexamined Patent Application Publication (JP-A) No. 2003-331869 discloses a composite electrolyte membrane which includes an organic polymer and a metal-oxide hydrate dispersed therein. Although being not an inorganic/organic composite electrolyte membrane, PCT International Publication Number WO 00/54351 discloses an electrolyte membrane which includes a porous base material that is not substantially swellable to methanol and water, whose pores are filled with a proton conductive polymer.

As is described above, composite electrolyte membranes have received attention as electrolyte membranes having both a high proton conductivity and a low methanol permeability.

The present inventors revealed that, of these composite electrolyte membranes, those including a proton conductive metal-oxide hydrate and a proton conductive organic polymer are a potential candidate for electrolyte membranes having both a high proton conductivity and a low methanol permeability. It was expected that such a metal-oxide hydrate blocks methanol and allows selective transfer of protons; and that composite electrolyte membranes including the metal-oxide hydrate dispersed in an organic polymer can have both a high proton conductivity and a low methanol permeability.

Even these composite electrolyte membranes, however, should satisfy various conditions in order to exhibit their original characteristic properties sufficiently.

Accordingly, an object of the present invention is to provide both a high proton conductivity and a low methanol permeability in a composite electrolyte membrane including an organic polymer and a metal-oxide hydrate dispersed therein, and to improve the output of an MEA.

SUMMARY OF THE INVENTION

According to an embodiment of the present invention, there is provided a composite electrolyte membrane for a fuel cell, which includes a proton conductive metal-oxide hydrate and a proton conductive organic polymer, in which the metal-oxide hydrate is in the form of particles having a particle diameter of 1 nm or more and 10 nm or less, and/or the metal-oxide hydrate contains 2.7 or more and 10 or less molecules of hydration water per one molecule of metal.

According to another embodiment of the present invention, there is provided a membrane electrode assembly which includes a cathode catalyst layer that reduces an oxidant gas; an anode catalyst layer that oxidizes methanol; and the composite electrolyte membrane arranged between the cathode catalyst layer and the anode catalyst layer.

In yet another embodiment of the present invention, there is provided a direct methanol fuel cell (DMFC) and a polymer electrolyte fuel cell (PEFC), each of which includes the membrane electrode assembly.

According to still another embodiment of the present invention, there is provided a method of producing a composite electrolyte membrane for a fuel cell, the composite electrolyte membrane including a proton conductive metal-oxide hydrate and a proton conductive organic polymer, the method includes the steps of preparing the metal-oxide hydrate as particles by hydrolysis or hydrothermal synthesis under such conditions as to have a particle diameter of 1 nm or more and 10 nm or less and/or to contain 2.7 to 10 molecules of hydration water per one molecule of metal; dissolving the organic polymer in a solvent to give a varnish; mixing the particles of metal-oxide hydrate with the varnish to give a mixture; and forming a membrane from the mixture.

According to embodiments of the present invention, both a high proton conductivity and a low methanol permeability are provided in composite electrolyte membranes including an organic polymer and a metal-oxide hydrate dispersed therein, and the outputs of MEAs are improved.

DETAILED DESCRIPTION OF THE PREFERRED EMBODIMENTS

The present inventors made investigations to optimize the particle diameter and characteristic properties of a metal-oxide hydrate in a composite electrolyte membrane including an organic polymer and the metal-oxide hydrate dispersed therein, so as to provide both a high proton conductivity and a low methanol permeability.

A metal-oxide hydrate dispersed as particles having a large particle diameter may allow methanol to permeate through interstices between the particles and thereby fail to inhibit methanol permeation sufficiently. In addition, even when the metal-oxide hydrate particles are dispersed, the methanol permeability may increase conversely. Accordingly, the present inventors considered that a metal-oxide hydrate to be dispersed as particles should have a particle diameter at a certain level or below.

The characteristic properties, typified by proton conductivity, of a metal-oxide hydrate vary significantly depending on the number of its hydration water molecules. In general, the proton conductivity increases with an increasing number of hydration water molecules. A metal-oxide hydrate having a small number of hydrate water molecules, even if dispersed as particles, may not sufficiently contribute to improvement in proton conductivity of the resulting composite electrolyte membrane. Accordingly, the present inventors considered that a metal-oxide hydrate to be dispersed should have a certain number or more of hydration water molecules.

Consequently, they found that both a high proton conductivity and a low methanol permeability are provided by controlling the metal-oxide hydrate to be dispersed as particles having a particle diameter of 1 nm or more and 10 nm or less and/or by controlling the metal-oxide hydrate to have 2.7 or more and 10 or less molecules of hydration water per one molecule of metal.

Composite electrolyte membranes according to embodiments of the present invention have both a high proton conductivity and a low methanol permeability so as to provide MEAs with high outputs.

Some embodiments of the present invention will be illustrated in detail below with reference to the attached drawings. All numbers are herein assumed to be modified by the term "about."

Figure 1:
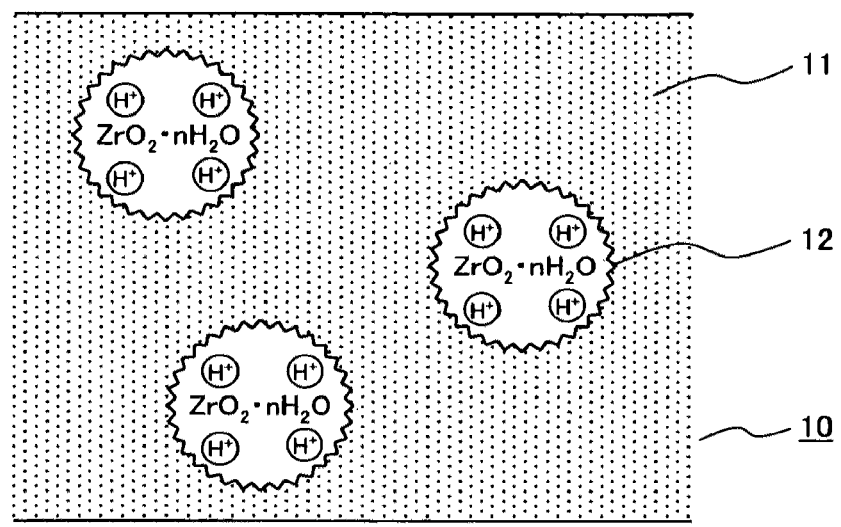
FIG. 1 is a schematic view of a known composite electrolyte membrane.

FIG. 1 is a schematic view of a known composite electrolyte membrane which includes a proton conductive metal-oxide hydrate and an organic polymer. A composite electrolyte membrane 10 includes an organic polymer 11 having a proton donor such as sulfonic acid group; and a proton conductive metal-oxide hydrate 12. Zirconium oxide hydrate $ZrO_2.nH_2O$ is shown as an example in FIG. 1.

The organic polymer shows proton conductivity in a hydrous state. This is because protons are dissociated from the proton donor, such as sulfonic acid group, and travel within the organic polymer in a hydrous state. If this organic polymer is used in a DMFC, methanol, in addition to water, also travels in the organic polymer, because methanol has substantially the same size as water and is miscible with water.

In the metal-oxide hydrate, protons travel through hydration water in crystals, i.e., interlayer water or water of crystallization. The water of crystallization in crystals is immobilized to crystals and do not move. The travel (conduction) of methanol depends on that of water, and in a region where water does not travel, methanol also does not travel. Accordingly, methanol does not move or travel within the metal-oxide hydrate. In addition, such metal-oxide hydrates have relatively high proton conductivity as inorganic materials. Typically, a zirconium oxide hydrate $ZrO_2.nH_2O$ has a proton conductivity of $2.8 \times 10^{-3}$ S/cm, and a tin oxide hydrate $SnO_2.nH_2O$ has a proton conductivity of $4.7 \times 10^{-3}$ S/cm, at 25° C.

Thus, it is expected to provide an electrolyte membrane that blocks methanol and selectively allow protons to permeate therethrough by using a composite electrolyte membrane including an organic polymer and a metal-oxide hydrate having different proton and methanol conduction mechanisms. In other words, it is expected to provide improve the trade-off between proton conductivity and methanol permeability occurring in single electrolyte membranes of organic polymers.

The characteristic properties of actual composite electrolyte membranes, however, significantly vary depending typically on the particle diameter and characteristic properties of a metal-oxide hydrate to be dispersed as particles. Typically, if a metal-oxide hydrate is dispersed as large particles and these large particles aggregate, methanol may permeate through interstices between the particles. To exhibit expected performance, therefore, the metal-oxide hydrate should be dispersed as particles having a particle diameter at certain level or smaller.

In addition, the characteristic properties typified by proton conductivity of a metal-oxide hydrate significantly vary depending on the number of its hydration water molecules. The proton conductivity is liable to decrease with a decreasing number of hydration water molecules. Accordingly, it is expected that the proton conductivity may not be effectively improved unless the metal-oxide hydrate has a certain number of hydration water molecules or more, even when it is dispersed as particles to form a composite electrolyte membrane.

After intensive investigations, the present inventors succeeded to optimize the particle diameter and number of hydration water molecules of a metal-oxide hydrate to be dispersed as particles in a composite electrolyte membrane including the metal-oxide hydrate and an organic polymer, so as to exhibit its expected performance.

As a result, they found that a composite electrolyte membrane has an effectively improved proton conductivity when it uses a metal-oxide hydrate dispersed as particles and containing 2.7 or more molecules of hydration water per one molecule of metal. However, in addition to the interlayer water and water of crystallization, surface adsorbed water will increase with an increasing number of hydration water molecules. This surface adsorbed water is not completely fixed within crystals, in contrast to the interlayer water and water of crystallization. The increased surface adsorbed water allows methanol to travel through the surface adsorbed water, to thereby increase the methanol permeability. Accordingly, the number of hydration water molecules is preferably 10 or less per one molecule of metal.

In addition, it was found that a metal-oxide hydrate dispersed as particles having a particle diameter of 10 nm or less effectively suppresses the methanol permeation in a composite electrolyte membrane. It was also found that a metal-oxide hydrate dispersed as particles having a particle diameter of more than 200 nm may invite higher methanol permeability of the resulting composite electrolyte membrane, as compared to a single electrolyte membrane. The metal-oxide hydrate particles preferably have a particle diameter as small as possible, but the theoretical minimum particle diameter thereof is about 1 nm. This minimum particle diameter is estimated to be about 1 nm, in consideration that water molecule has a diameter of about 0.3 nm; oxygen has a van der Waals radius of 0.14 nm; and a metal atom has an atomic radius of 0.16 nm for zirconium (Zr) and 0.145 nm for tin (Sn). As used herein the "metal-oxide hydrate" refers to one in the form of particles having a particle diameter of 1 nm or more.

Metal-oxide hydrates satisfying these requirements may be produced typically by hydrolysis or hydrothermal synthesis.

Typically, $ZrO_2.nH_2O$, one of metal-oxide hydrates, may be synthetically prepared according to the following methods.

In preparation through hydrolysis, zirconium oxychloride (octahydrate) $ZrOCl_2.8H_2O$ may be used as a starting material. Initially, zirconium oxychloride is dissolved in water to give an aqueous solution. The concentration of zirconium oxychloride is preferably 50 percent by weight or less, because fine particles are more easily prepared at such a low concentration. The aqueous zirconium oxychloride solution is adjusted to be basic to allow hydrolysis represented by following Scheme (3) to proceed:

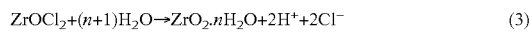

$$ZrOCl_2 + (n+1)H_2O \rightarrow ZrO_2.nH_2O + 2H^+ + 2Cl^- \quad (3)$$

The obtained $ZrO_2.nH_2O$ is filtrated, washed with pure water several times, dried, and thereby yields $ZrO_2.nH_2O$.

For controlling the aqueous zirconium oxychloride solution to be basic, for example, the aqueous zirconium oxychloride solution may be combined with or added to an aqueous ammonia solution. Typically, an atomizer or injector may be used when the aqueous zirconium oxychloride solution is added to an aqueous ammonia solution. The $ZrO_2.nH_2O$ may also be prepared by spraying the aqueous zirconium oxychloride solution into ammonia ($NH_3$) gas.

In preparation through hydrothermal synthesis, zirconium oxychloride $ZrOCl_2.8H_2O$ may also be used as a starting material. Initially, zirconium oxychloride is dissolved in water to give an aqueous solution. In addition, sodium hydroxide (NaOH) is dissolved in water to give another aqueous solution. The sodium hydroxide herein acts as a flux agent to promote grain growth, and such flux agent also include ammonia $NH_3$.

The aqueous zirconium oxychloride solution is then added to the aqueous sodium hydroxide solution typically with a microtube pump. At the instant of addition, the reaction represented by Scheme (3) occurs to give amorphous $ZrO_2.nH_2O$.

The reaction mixture is aged by leaving left stand overnight. The reaction mixture is then transferred to a pressure-resistant container and the container is placed in a thermostatic chamber, followed by carrying out hydrothermal synthesis. The hydrothermal synthesis is carried out at temperatures of preferably 80° C. to 300° C., for a period of preferably 2 hours or more, and more preferably around 4 hours. The reaction mixture is filtrated to separate a solution from $ZrO_2.nH_2O$. After washing with pure water several times and drying, $ZrO_2.nH_2O$ is obtained.

The number of hydration water molecules of the metal-oxide hydrate may be determined based on weight loss in thermogravimetry (TG) using a thermogravimetric analyzer. Specifically, when the sample is heated to 500° C., all the hydration water evaporates, and the number of hydration water molecules is calculated from the weight loss due to the evaporation of the hydration water.

The particle diameter of the metal-oxide hydrate may be determined based on the half width measured by transmission electron microscopic observation (TEM observation) or X-ray diffractometry (XRD), or determined by a small angle X-ray scattering technique. As used herein the "particle diameter(s)" of a metal-oxide hydrate refers to particle diameter(s) as determined according to a small angle X-ray scattering technique.

Inorganic/organic composite electrolyte membranes according to embodiments of the present invention can be used in polymer electrolyte fuel cells (PEFCs; proton-exchange membrane fuel cells) using hydrogen instead of methanol. The inorganic/organic composite electrolyte membranes including a metal-oxide hydrate and an organic polymer are advantageously used in PEFCs, because the resulting PEFCs can operate at temperatures higher than the operating temperatures (70° C. to 80° C.) in known PEFCs.

Specifically, a metal-oxide hydrate includes hydration water within its crystal and is thereby capable of retaining moisture. Dispersion of the metal-oxide hydrate in an organic polymer enables the entire membrane to retain moisture. A known single electrolyte membrane of organic polymer may operate at temperatures of at highest about 70° C. to 80° C., since moisture in the membrane evaporates at elevated temperatures to thereby reduce the proton conductivity. In contrast, the composite electrolyte membrane including a metal-oxide hydrate dispersed in an organic polymer can maintain a satisfactory proton conductivity even at elevated temperatures, because the membrane is capable of retaining moisture. Such higher operating temperatures advantageously improve output, save the noble metal catalysts such as platinum (Pt), and make effective use of waste heat.

JP-A No. 2002-198067, JP-A No. 2002-289051, and JP-A No. 2003-142124 propose composite electrolyte membranes including an organic polymer and tungsten oxide, molybdenum oxide, or tin oxide, as electrolyte membranes for high-temperature operating PEFCs. These composite electrolyte membranes make it possible to elevate the operating temperatures of PEFCs to about 100° C.

However, such PEFCs, if using inorganic/organic composite electrolyte membranes, suffer from problems as in DMFCs. Specifically, they may not fully exhibit their expected performance under some conditions of metal-oxide hydrates to be dispersed. Typically, if a metal-oxide hydrate is in the form of particles having a large particle diameter, hydrogen gas or air as a fuel might permeate through interstices at the interfaces between particles. This limits the output of PEFC. In addition, if a metal-oxide hydrate has a small number of hydration water molecules, the resulting composite membrane may show insufficient capability of retaining moisture and exhibit insufficient proton conductivity.

Composite electrolyte membranes according to embodiments of the present invention include a proton conductive metal-oxide hydrate and a proton conductive organic polymer, in which the metal-oxide hydrate is in the form of particles having a particle diameter of 1 nm or more and 10 nm or less and/or the metal-oxide hydrate contains 2.7 or more and 10 or less molecules of hydration water per one molecule of metal. These composite electrolyte membranes are also adoptable to PEFCs, and particularly to high-temperature operating PEFCs. These composite electrolyte membranes enable higher outputs of PEFCs.

Examples of the proton conductive metal-oxide hydrate include zirconium oxide hydrates, tungsten oxide hydrates, tin oxide hydrates, niobium-doped tungsten oxides, silicon oxide hydrates, zirconium-doped silicon oxide hydrates, tungstophosphoric acids, and molybdophosphoric acids. Each of these metal-oxide hydrates can be used alone or in combination. Among them, zirconium oxide hydrates are preferred as the metal-oxide hydrates to be dispersed in electrolyte membranes for high-temperature operating PEFCs.

Examples of the organic polymer include perfluorocarbon sulfonates; and engineering plastic materials doped, chemically bonded, or immobilized with a proton donor such as sulfonic acid group, phosphonic acid group, or carboxyl group. Examples of engineering plastic materials are polystyrenes, polyether ketones, polyether ether ketones, polysulfones, and polyether sulfones. In a preferred embodiment, these materials have cross-linked structures or are partially fluorinated, for higher stability.

A metal-oxide hydrate, if dispersed in a content of less than 5 percent by weight in the organic polymer may not be substantially effective. In contrast, a metal-oxide hydrate, if dispersed in a content of more than 80 percent by weight, may be liable to aggregate and fail to form a membrane. The content of the metal-oxide hydrates is therefore preferably 5 to 80 percent by weight, and more preferably 10 to 60 percent by weight.

The composite electrolyte membranes may be prepared, for example, according to a simple dispersion technique.

In the simple dispersion technique, a metal-oxide hydrate is synthesized; an organic polymer is dissolved in a solvent to give a varnish; and the synthesized metal-oxide hydrate is mixed with the varnish to form a membrane on a substrate. More specifically, the previously synthesized metal-oxide hydrate is mixed with the varnish as a solution of the organic polymer in the solvent; the resulting varnish mixture is formed into a membrane on a substrate; the solvent is evaporated to give an inorganic/organic composite electrolyte membrane; and the composite electrolyte membrane is peeled off from the substrate by immersing in water.

The mixing of the organic polymer varnish and the metal-oxide hydrate can be conducted, for example, by using a stirrer, a ballmill, a jet mill, or a nanomill, or by the application of ultrasound.

The membrane formation can be conducted by any procedure such as dip coating, spray coating, roll coating, application with a doctor blade, gravure coating, or screen printing.

The substrate is not particularly limited, as long as a membrane can be formed thereon and the formed membrane can be peeled off therefrom, and examples thereof include glass plates, polytetrafluoroethylene sheets, and polyimide sheets.

The solvent for the organic polymer is not particularly limited, as long as it can dissolve the organic polymer therein and can be removed thereafter. Examples of the solvent include aprotic polar solvents such as N,N-dimethylformamide, N,N-dimethylacetamide, N-methyl-2-pyrrolidone, and dimethyl sulfoxide; alkylene glycol monoalkyl ethers such as ethylene glycol monomethyl ether, ethylene glycol monoethyl ether, propylene glycol monomethyl ether, and propylene glycol monoethyl ether; halogen-containing solvents such as dichloromethane and trichloroethane; and alcohols such as isopropyl alcohol and tertiary-butyl alcohol.

The thickness of a composite electrolyte membrane according to an embodiment of the present invention is preferably, but is not limited to, 10 to 200 µm. The thickness is preferably 10 µm or more to give a membrane having such a mechanical strength as to withstand practical use; and it is preferably 200 µm or less to reduce the membrane resistance and to improve power generation performance. The thickness is more preferably 30 to 100 µm. When a membrane is formed by solution casting, the thickness can be controlled by adjusting the solution concentration or the thickness of a coat applied to the substrate. When a membrane is formed from a molten state, the thickness can be controlled by stretching a membrane with a predetermined thickness to a predetermined draw ratio, which membrane has been prepared typically by melting and pressing or by melting and extruding.

An MEA including a composite electrolyte membrane according to an embodiment of the present invention can be prepared in the following manner.

Initially, a cathode catalyst paste is prepared by sufficiently mixing a platinum-supporting carbon, a solid polymer electrolyte, and a solvent for the solid polymer electrolyte. In addition, an anode catalyst paste is prepared by sufficiently mixing a platinum-ruthenium alloy-supporting carbon, a solid polymer electrolyte, and a solvent for the solid polymer electrolyte. These pastes are each applied to a release film such as a polyfluoroethylene (PTFE) film typically by spray drying, dried at 80° C. to evaporate the solvent, and thereby a cathode catalyst layer and an anode catalyst layer is formed.

Next, these cathode and anode catalyst layers are bonded with the interposition of the composite electrolyte membrane by hot pressing. The release films are peeled off, to give the MEA including the composite electrolyte membrane.

Another way how to make the MEA including the composite electrolyte membrane is as follows. As described above, a cathode catalyst paste is prepared by sufficiently mixing a platinum-supporting carbon, a solid polymer electrolyte, and a solvent for the solid polymer electrolyte; and an anode catalyst paste is prepared by sufficiently mixing a platinum-ruthenium alloy-supporting carbon, a solid polymer electrolyte, and a solvent for the solid polymer electrolyte. These pastes are each directly applied to the composite electrolyte membrane according to an embodiment of the present invention typically by spray drying.

Polymer materials having proton conductivity are used as the solid polymer electrolytes for use in the catalyst layers in the MEA including the composite electrolyte membrane. Examples of the proton conductive polymer materials include sulfonated or alkylenesulfonated fluorocarbon polymers and polystyrenes, typified by perfluorocarbon sulfonic acid type resins and polyperfluorostyrenic sulfonic acid type resins. Examples of the proton conductive polymer materials further include polysulfones, polyether sulfones, polyether ether sulfones, polyether ether ketones, and hydrocarbon-based polymers, each of which has an introduced proton donor such as sulfonic acid group. It is also possible to use a composite electrolyte including an organic polymer and a metal-oxide hydrate according to an embodiment of the present invention as the solid polymer electrolyte.

Catalyst metals for use herein preferably include at least platinum in the cathode, and at least platinum or a ruthenium-containing platinum alloy in the anode. However, the catalyst metals are not limited to these; and a catalyst further including a third component such as iron, tin, or a rare-earth element in addition to the above noble metal components may be used to stabilize the electrode catalysts and prolong their lifetimes.

Figure 2:
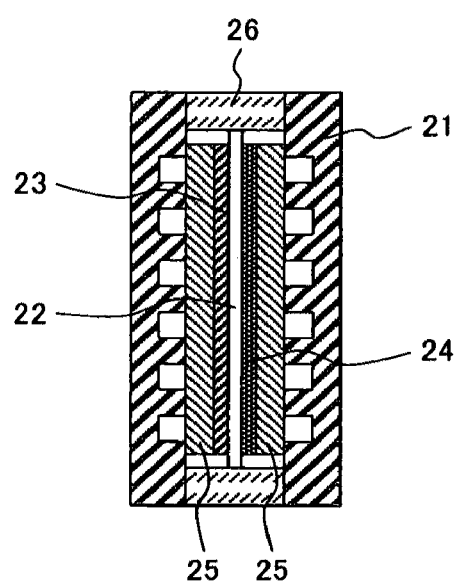
FIG. 2 is a schematic illustration of a fuel cell according to an embodiment of the present invention.

FIG. 2 illustrates a direct methanol fuel cell as an embodiment of the present invention. This direct methanol fuel cell includes separators (separators) 21, a composite electrolyte membrane 22 according to an embodiment of the present invention, which includes a proton conductive metal-oxide hydrate and a proton conductive organic polymer, an anode catalyst layer 23, a cathode catalyst layer 24, gas diffusion layers 25; and gaskets 26. The composite electrolyte membrane 22 bonded with the anode catalyst layer 23 and cathode catalyst layer 24 constitutes a membrane electrolyte assembly (MEA).

The separators 21 are electroconductive, and they are preferably made from a dense graphite plate, a carbon plate molded from a carbonaceous material such as graphite or carbon black with a resin, or a metallic material with excellent resistance to corrosion such as stainless steel or a titanium material. It is also preferred to perform surface treatment on the surfaces of the separators 21 by plating them with a noble metal or by applying an electroconductive coating with superior resistance to corrosion and heat. Grooves are disposed in the surface of one separator 21 that faces the anode catalyst layer 23 and in the surface of the other separator 21 that faces the cathode catalyst layer 24. An aqueous methanol solution as a fuel is fed to grooves on the anode side, and air is fed to grooves on the cathode side. When a hydrogen gas is fed as a fuel instead of the aqueous methanol solution in the configuration of FIG. 2, an example of a PEFC according to an embodiment of the present invention is implemented.

Figure 3:
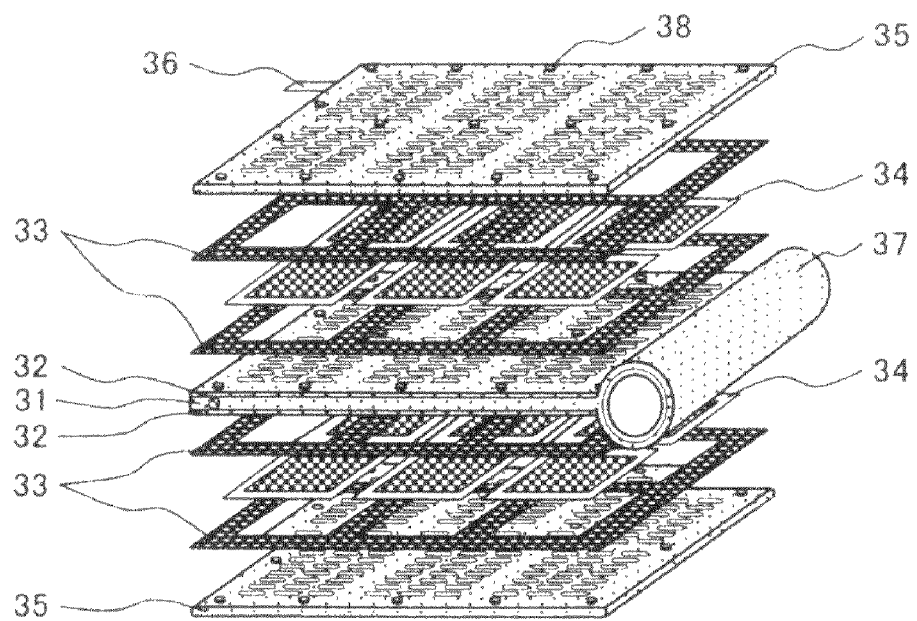
FIG. 3 is a schematic illustration of components of a fuel cell according to an embodiment of the present invention.
Figure 4:
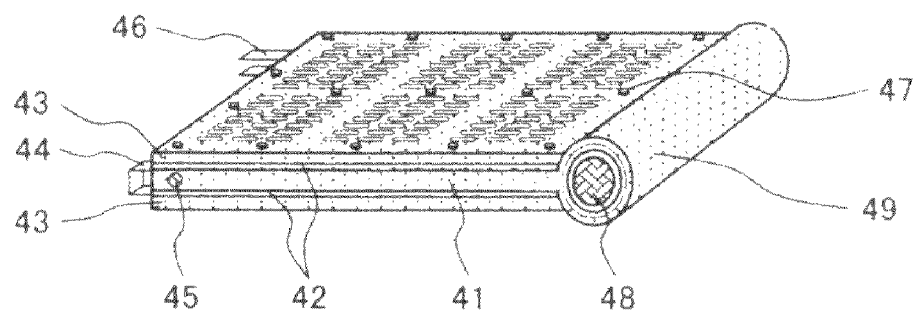
FIG. 4 is a perspective outside view of a fuel cell according to an embodiment of the present invention.

A direct methanol fuel cell for a mobile unit can be configured by using the MEA including the composite electrolyte membrane according to an embodiment of the present invention. FIGS. 3 and 4 show an example of a direct methanol fuel cell designed for a personal digital assistant (PDA). FIG. 3 schematically illustrates components thereof. An anode end plate 32, a gasket 33, a diffusion layer-equipped MEA 34, another gasket 33, and a cathode end plate 35 are sequentially stacked in this order on each surface of a fuel chamber 31 with a cartridge holder 37. The two stacks are combined and fixed with screws 38 so that a pressure applied within the stacks is approximately uniformed. A terminal 36 is led from each of the anode end plate 32 and cathode end plate 35 so that electric power can be delivered.

FIG. 4 schematically illustrates the fuel cell having the configuration in FIG. 3. A plurality of MEAs (twelve MEAs in FIG. 4) is connected in series on two sides of a fuel chamber 41. The MEAs connected in series on the two sides are further connected in series through a connection terminal 44 so that electric power can be delivered from an output terminal 46. In FIG. 4, an aqueous methanol solution is supplied under pressurization by a high-pressure liquefied gas or high-pressure gas from a fuel cartridge 48 housed in a cartridge holder 49, or by the action of a spring. Carbon dioxide gas generated at the anode is exhausted from a gas exhaust port 45. The gas exhaust port 45 has a gas-liquid separating function, so it passes a gas but does not pass a liquid. Air used as an oxidant is fed by diffusing through air diffusion slits in the cathode end plate 43; and water generated at the cathode is exhausted by diffusing through the slits. The way how the components are integrated to form the fuel cell is not limited to the tightening of them with screws 47; and the stacks may be inserted into a casing and integrated by compressing forces in the casing. The reference numeral 42 in FIG. 4 denotes an anode end plate.

The present invention will be illustrated in further detail with reference to several examples below, which by no means limit the scope of the present invention.

EXAMPLE 1

A zirconium oxide hydrate $ZrO_2 \cdot nH_2O$ and a sulfonated methyl-polyether sulfone (SM-PES) composed of a polyether sulfone introduced with sulfonic acid groups were used as a metal-oxide hydrate and an organic polymer, respectively. The organic polymer used herein had an ion exchange capacity per dry weight of 1.25 meq/g.

Initially, the zirconium oxide hydrate $ZrO_2 \cdot nH_2O$ was prepared by hydrolysis using zirconium oxychloride $ZrOCl_2 \cdot 8H_2O$ as a starting material.

Specifically, $ZrOCl_2 \cdot 8H_2O$ was dissolved in water to give an aqueous solution having a concentration of 1 percent by weight. This aqueous solution was sprayed with an injector to a 25 percent by weight aqueous ammonia solution to proceed hydrolysis represented by following Scheme (4):

$$ZrOCl_2 + (n+1)H_2O \rightarrow ZrO_2 \cdot nH_2O + 2H^+ + 2Cl^- \quad (4)$$

Filtration was then conducted to separate $ZrO_2 \cdot nH_2O$ particles. Washing with pure water three times and drying at 50° C. gave $ZrO_2 \cdot nH_2O$ particles.

The $ZrO_2 \cdot nH_2O$ particles were found to have a number "n" of hydration water molecules of 2.72 through thermogravimetry, and were found to have a particle diameter of 200 nm through small-angle X-ray diffraction measurement.

Using the $ZrO_2 \cdot nH_2O$ particles, a composite electrolyte membrane was prepared. Initially, SM-PES was dissolved in dimethyl sulfoxide to give a varnish having a solute concentration of 20 percent by weight. The varnish was then mixed with the $ZrO_2 \cdot nH_2O$ particles in a ballmill with stirring for 10 hours.

The varnish mixture was applied to a glass plate using an applicator, and dried in a vacuum dryer at 60° C. for 3 hours to evaporate dimethyl sulfoxide as the solvent. Next, the applied coat was immersed in water to be peeled off from the glass plate. The coat was then immersed in a 1 M aqueous sulfuric acid solution to be protonated, and thereby yielded a SM-PES containing $ZrO_2 \cdot nH_2O$ particles dispersed in a content of 50 percent by weight. The prepared composite electrolyte membrane was entirely uniform, was semitransparent white, and had a thickness of 50 µm.

The proton conductivity of the above-prepared composite electrolyte membrane was measured at 40° C. and relative humidity of 100%. Specifically, the proton conductivity was calculated by pressing two platinum wires to the composite electrolyte membrane and measuring the impedance between the two platinum wires.

In addition, the methanol permeability of the composite electrolyte membrane was measured by gas chromatography. A cell used for the measurement of the methanol permeability included two chambers with the interposition of the electrolyte membrane; an aqueous methanol solution placed in one chamber, and pure water placed in the other chamber. The cell was placed in a water bath at 40° C., and samples were taken from the chamber containing pure water every 10 minutes. The amounts of methanol contained in the samples were measured by gas chromatography to thereby calculate the amount of methanol permeated from the aqueous methanol solution through the electrolyte membrane toward the pure water. The methanol permeability was indicated in unit of $g \cdot \mu m/cm^2 \cdot min$, in which the amount of methanol permeated per 1 minute is normalized by the thickness and area.

Then an MEA was prepared using the above-prepared composite electrolyte membrane in the following manner. A platinum-supporting carbon TEC10V50E supplied by Tanaka Kikinzoku Kogyo K.K. (supporting 50 percent by weight of platinum) was used as a cathode catalyst; and a platinum-ruthenium-supporting carbon TEC61V54 supplied by Tanaka Kikinzoku Kogyo K.K. (supporting 29 percent by weight of platinum and 23 percent by weight of ruthenium) as an anode catalyst. Water and a 5 percent by weight Nafion solution supplied by Sigma-Aldrich were mixed with these catalysts while stirring, to yield catalyst slurries. The catalyst slurry for the cathode was a 1:1:8.46 (by weight) mixture of TEC10V50E:water:(5 percent by weight Nafion solution); and the catalyst slurry for the anode was a 1:1:7.9 (by weight) mixture of TEC61V54:water:(5 percent by weight Nafion solution). These catalyst slurries were each applied to a polytetrafluoroethylene sheet using an applicator, to give a cathode catalyst layer and an anode catalyst layer. The cathode catalyst layer and anode catalyst layer were then thermally transferred to the composite electrolyte membrane prepared in this example by hot pressing and thereby yielded the MEA. The anode catalyst layer contained 1.8 $mg/cm^2$ of platinum-ruthenium alloy; and the cathode catalyst layer contained 1.2 $mg/cm^2$ of platinum.

Figure 5:
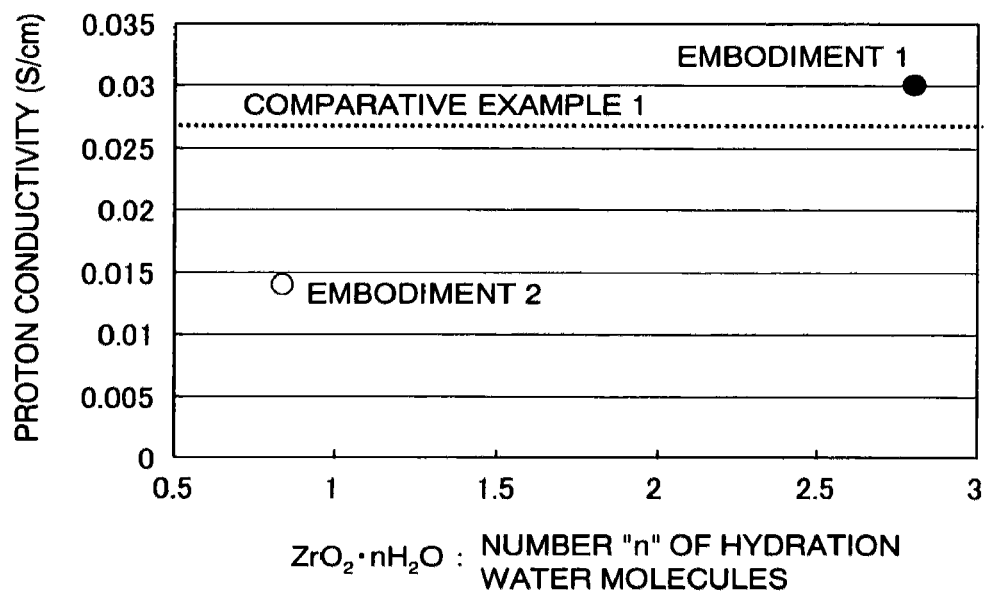
FIG. 5 is a characteristic diagram comparing the proton conductivity in Examples 1 and 2, and Comparative Example 1.
Figure 6:
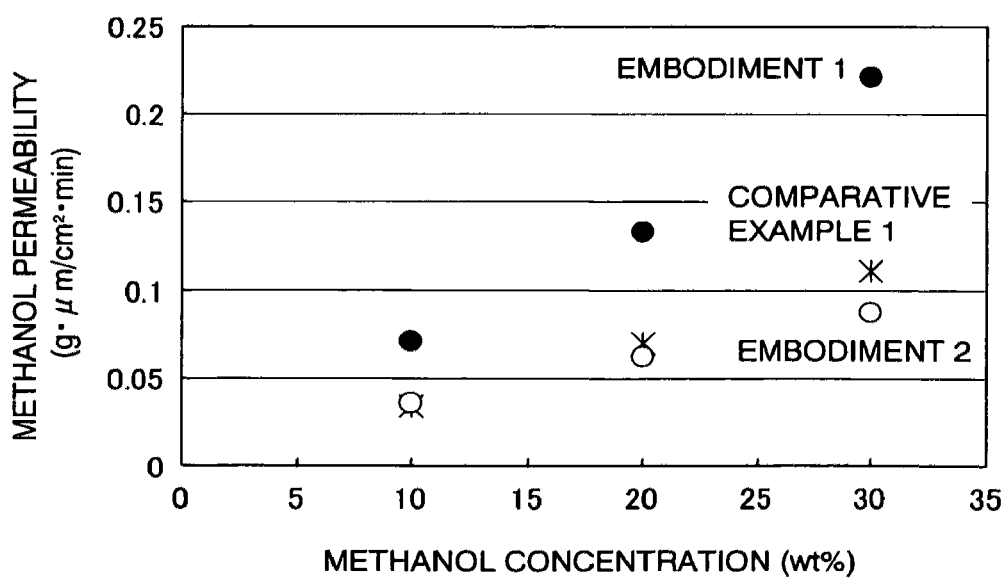
FIG. 6 is a characteristic diagram comparing the methanol permeability in Examples 1 and 2, and Comparative Example 1.
Figure 7:
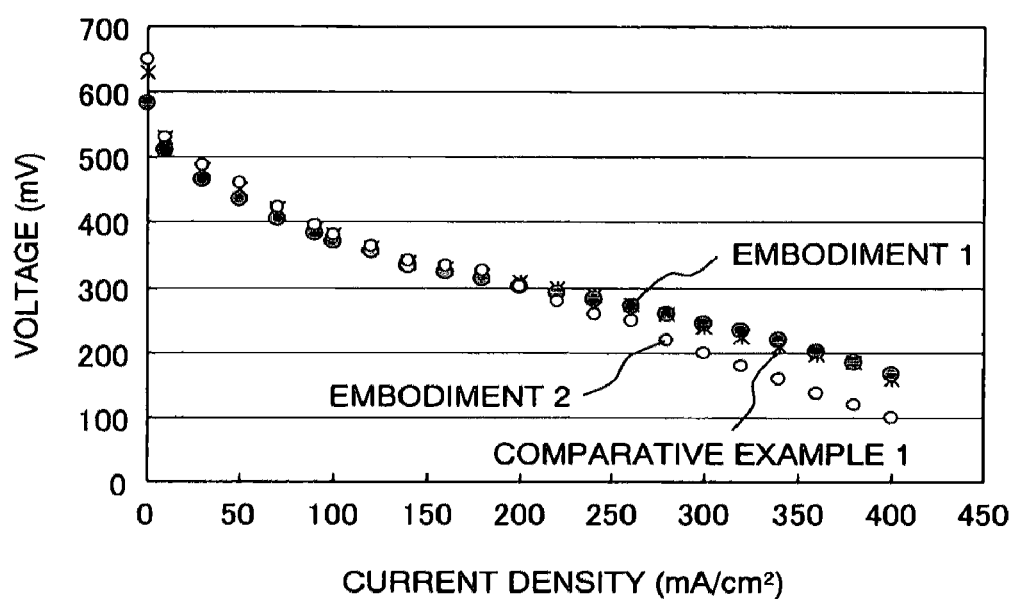
FIG. 7 is a graph showing the current-voltage curve in Examples 1 and 2, and Comparative Example 1.

The MEA was assembled into a cell having the configuration in FIG. 2, and a current-voltage curve of the cell was measured. Air was fed to the cathode by spontaneous expiration; and an aqueous methanol solution was fed to the anode at a rate of 10 ml/min. The aqueous methanol solution had a concentration of 20 percent by weight. The current-voltage curve was measured at 25° C. using this test cell. These results are shown in FIGS. 5 to 7.

EXAMPLE 2

A zirconium oxide hydrate $ZrO_2 \cdot nH_2O$ and a SM-PES composed of a polyether sulfone introduced with sulfonic acid groups were used as a metal-oxide hydrate and an organic polymer, respectively. The organic polymer used herein had an ion exchange capacity per dry weight of 1.25 meq/g.

Initially, the zirconium oxide hydrate $ZrO_2 \cdot nH_2O$ was prepared by hydrothermal synthesis using zirconium oxychloride $ZrOCl_2 \cdot 8H_2O$ as a starting material.

Specifically, 8 g of zirconium oxychloride $ZrOCl_2 \cdot 8H_2O$ was dissolved in 100 ml of water to give an aqueous solution. In addition, 10 g of sodium hydroxide was dissolved in 300 ml of water to give another aqueous solution. The aqueous zirconium oxychloride solution was added to the aqueous sodium hydroxide solution using a microtube pump. At the time when the solution was added, white precipitates were formed, which are considered to be amorphous $ZrO_2 \cdot nH_2O$. The mixture was left stand overnight, whereby the mixture separated to white precipitates and a transparent supernatant liquid. The mixture was then transferred into a pressure-resistant container, and the container was left stand in a thermostatic chamber, to carry out hydrothermal treatment at a temperature of 100° C. for a duration of 4 hours.

After the hydrothermal treatment, the mixture was filtrated to separate $ZrO_2 \cdot nH_2O$ particles from a solution. Washing with pure water and drying at 60° C. gave $ZrO_2 \cdot nH_2O$ particles.

The $ZrO_2 \cdot nH_2O$ particles were found to have a number "n" of hydration water molecules of 0.84 through thermogravimetry, and were found to have a particle diameter of 10 nm through small-angle X-ray diffraction measurement.

Using the $ZrO_2 \cdot nH_2O$ particles, a composite electrolyte membrane was prepared by the procedure of Example 1.

The proton conductivity and methanol permeability of the above-prepared composite electrolyte membrane were measured under the same conditions as in Example 1. An MEA using the composite electrolyte membrane was prepared by the procedure of and under the conditions of Example 1, and the current-voltage curve of the MEA was measured. These results are shown in FIGS. 5 to 7.

Comparative Example 1

An electrolyte membrane herein was prepared from a SM-PES. The SM-PES having an ion exchange capacity of 1.25 meq/g was dissolved in dimethyl sulfoxide to give a varnish having a solute concentration of 20 percent by weight. The varnish was applied to a glass plate using an applicator and dried in a vacuum dryer at 60° C. for 3 hours to evaporate dimethyl sulfoxide as the solvent. Next, the applied coat was immersed in water to be peeled off from the glass plate. The coat was then immersed in a 1 M aqueous sulfuric acid solution to be protonated, and thereby yielded a single electrolyte membrane composed of SM-PES. The electrolyte membrane was transparent and had a thickness of 50 μm.

The proton conductivity and methanol permeability of the above-prepared electrolyte membrane were measured under the same conditions as in Example 1. An MEA using the electrolyte membrane was prepared by the procedure of and under the conditions of Example 1, and the current-voltage curve of the MEA was measured. These results are shown in FIGS. 5 to 7.

Consideration on Results in Example 1, Example 2, and Comparative Example 1

FIG. 5 shows the proton conductivity plotted against the number "n" of hydration water molecules in $ZrO_2.nH_2O$, for Example 1, Example 2, and Comparative Example 1, respectively.

The single electrolyte membrane of SM-PES (ion exchange capacity: 1.25 meq/g) according to Comparative Example 1 had a proton conductivity of 0.027 S/cm, whereas the composite electrolyte membrane according to Example 1 including SM-PES and $ZrO_2.nH_2O$ dispersed therein had a proton conductivity of 0.03 S/cm, at a temperature of 40° C. and relative humidity of 100%. In contrast, the composite electrolyte membrane according to Example 2 including SM-PES and $ZrO_2.nH_2O$ dispersed therein had a proton conductivity of 0.014 S/cm, lower than that of the SM-PES single electrolyte membrane of Comparative Example 1. This is probably because the $ZrO_2.nH_2O$ having a number of hydration water molecules of 0.84 originally has a low proton conductivity, whereby, even when the particles are formed into a composite electrolyte membrane, they do not sufficiently improve proton conduction but rather act to impede proton conduction.

FIG. 6 shows the methanol permeability for Example 1, Example 2, and Comparative Example 1, respectively.

The composite electrolyte membrane according to Example 1 showed a significantly higher methanol permeability than that of the SM-PES single electrolyte membrane of Comparative Example 1; whereas the composite electrolyte membrane according to Example 2 showed a methanol permeability substantially equivalent to that in Comparative Example 1 at a methanol concentration of 10 percent by weight; but it showed a lower methanol permeability than that in Comparative Example 1 at higher methanol concentrations. This is probably because, in the composite electrolyte membrane of Example 1, particles have a large particle diameter and thereby aggregate, whereby methanol permeates through interstices between such aggregated particles; in contrast, in Example 2, the $ZrO_2.nH_2O$ particles have a small particle diameter and thereby exhibit their expected methanol blocking function.

FIG. 7 shows the current-voltage curves of the samples in Example 1, Example 2, and Comparative Example 1, respectively.

The open circuit voltages (OCV) were 584 mV in Example 1, 650 mV in Example 2, and 630 mV in Comparative Example 1. The sample according to Example 1 had a low open circuit voltage probably because it had a high methanol permeability. The sample according to Example 1 showed a lower voltage than both of the samples according to Comparative Example 1 and Example 2 at low current densities, but it showed a high output voltage and the highest output density at higher current densities, because of its high proton conductivity. The sample of Example 1 showed a maximum output density of 75 mW/cm² at a current density of 320 mA/cm².

The sample of Example 2 had a low methanol permeability, thereby showed a high output voltage at low current densities, but showed not sufficiently high output voltage at higher current densities, because it had a low proton conductivity and showed a higher resistance drop (IR drop) due to its membrane resistance. The sample of Example 2 showed a maximum output density of 65 mW/cm² at a current density of 260 mA/cm².

In contrast, the SM-PES single electrolyte membrane of Comparative Example 1 showed a maximum output density of 72 mW/cm² at a current density of 300 mA/cm².

EXAMPLE 3

A zirconium oxide hydrate $ZrO_2.nH_2O$ and a SM-PES composed of a polyether sulfone introduced with sulfonic acid groups were used as a metal-oxide hydrate and an organic polymer, respectively. The organic polymer used herein had an ion exchange capacity per dry weight of 1.25 meq/g.

Initially, the zirconium oxide hydrate $ZrO_2.nH_2O$ was prepared by hydrolysis using zirconium oxychloride $ZrOCl_2.8H_2O$ as a starting material by the procedure of Example 1, except for using a 10 percent by weight aqueous ammonia solution in hydrolysis.

The prepared $ZrO_2.nH_2O$ particles were found to have a number "n" of hydration water molecules of 2.6 through thermogravimetry, and were found to have a particle diameter of 200 nm through small-angle X-ray diffraction measurement.

Using the $ZrO_2.nH_2O$ particles, a composite electrolyte membrane was prepared by the procedure of Example 1.

Next, its proton conductivity and methanol permeability were measured by the procedure of Example 1. In addition, an MEA was prepared and its current-voltage curve was measured by the procedure of and under the conditions of Example 1.

The sample of Example 3 showed a proton conductivity of 0.024 S/cm at 40° C. and relative humidity of 100%, lower than that of the SM-PES single electrolyte membrane of Comparative Example 1. This is probably because the $ZrO_2.nH_2O$ prepared in Example 3 had a number of hydration water molecules slightly lower than that of Example 1, and whereby it did not so effectively improve the proton conductivity. In contrast, this sample showed a methanol permeability of 0.12 at a methanol concentration of 20 percent by weight, which is substantially equivalent to that in Example 1. The MEA of Example 3 had a maximum output density of 68 mW/cm².

EXAMPLE 4

A zirconium oxide hydrate $ZrO_2.nH_2O$ and a SM-PES composed of a polyether sulfone introduced with sulfonic acid groups were used as a metal-oxide hydrate and an organic polymer, respectively. The organic polymer used herein had an ion exchange capacity per dry weight of 1.25 meq/g.

Initially, the zirconium oxide hydrate $ZrO_2.nH_2O$ was prepared by hydrothermal synthesis using zirconium oxychloride $ZrOCl_2.8H_2O$ as a starting material by the procedure of Example 2, except for carrying out hydrothermal treatment at temperatures of 90° C. and 120° C.

The number of hydration water molecules and particle diameter of the prepared $ZrO_2 \cdot nH_2O$ particles were measured by the procedure of Example 1.

Using the $ZrO_2 \cdot nH_2O$ particles, a composite electrolyte membrane was prepared, and its proton conductivity and methanol permeability were measured by the procedure of Example 1. In addition, an MEA was prepared and its current-voltage curve was measured by the procedure of and under the conditions of Example 1.

Table 1 shows the number of hydration water molecules and particle diameter of the $ZrO_2 \cdot nH_2O$; the proton conductivity and the methanol permeability at a methanol concentration of 20 percent by weight of the composite electrolyte membrane; and the maximum output density of the MEA, at different hydrothermal treatment temperatures. For reference, the data of Example 2, in which the hydrothermal treatment was conducted at 100° C., are also shown in Table 1.

The number of hydration water molecules tends to decrease with an elevating hydrothermal treatment temperature. The $ZrO_2 \cdot nH_2O$ particles prepared at different hydrothermal treatment temperatures each had a particle diameter of 10 nm. The composite electrolyte membranes using these particles showed proton conductivities lower than that of the SM-PES single electrolyte membrane of Comparative Example 1. This is probably because the $ZrO_2 \cdot nH_2O$ particles had smaller numbers of hydration water molecules, whereby they originally had low proton conductivities, and, even when the particles are formed into a composite electrolyte membrane, they do not sufficiently contribute to improvement in proton conductivity.

In contrast, the samples of Example 4 each showed a methanol permeability lower than that of the SM-PES single electrolyte membrane of Comparative Example 1. In addition, they showed a methanol permeability somewhat lower than that of the SM-PES single electrolyte membrane of Comparative Example 1, but they showed a lower output density due to their low proton conductivity.

Example 4, except for using an aqueous ammonia solution as a flux agent and carrying out hydrothermal treatment at temperatures of 80° C. and 100° C.

The number of hydration water molecules and particle diameter of the prepared $ZrO_2 \cdot nH_2O$ particles were measured by the procedure of Example 1. Using the $ZrO_2 \cdot nH_2O$ particles, a composite electrolyte membrane was prepared, and its proton conductivity and methanol permeability were measured by the procedure of Example 1. In addition, an MEA was prepared and its current-voltage curve was measured by the procedure of and under the conditions of Example 1.

Table 2 shows the number of hydration water molecules and particle diameter of the $ZrO_2 \cdot nH_2O$; the proton conductivity and the methanol permeability at a methanol concentration of 20 percent by weight of the composite electrolyte membrane; and the maximum output density of the MEA, at different hydrothermal treatment temperatures.

In the samples prepared by using ammonia $NH_3$ as a flux agent, the number of hydration water molecules increased with an elevating hydrothermal treatment temperature of from 80° C. to 100° C., in contrast to the samples in Example 4 where sodium hydroxide NaOH was used as a flux agent. In addition, the former samples could have particle diameters smaller than those in Example 4 where sodium hydroxide NaOH was used as a flux agent. In particular, the hydrothermal treatment at a temperature of 100° C. gave fine particles having a particle diameter of 1 nm.

The composite electrolyte membranes of Example 5 showed higher proton conductivities than that of the SM-PES single electrolyte membrane of Comparative Example 1, since the material $ZrO_2 \cdot nH_2O$ had a larger number of hydration water molecules. The samples prepared by hydrothermal treatment at temperatures of 80° C. and 100° C. showed lower methanol permeabilities at a methanol concentration of 20 percent by weight than that of the SM-PES single electrolyte membrane of Comparative Example 1. This is probably because the $ZrO_2 \cdot nH_2O$ was dispersed as fine particles having

TABLE 1

| Hydrothermal treatment temperature | Number "n" of hydration water in $ZrO_2 \cdot nH_2O$ | Particle diameter of $ZrO_2 \cdot nH_2O$ (nm) | Proton conductivity of composite electrolyte membrane (S/cm) | Methanol permeability of composite electrolyte membrane (g · μm/min · cm$^2$) | Maximum output density of composite electrolyte membrane (mW/cm$^2$) |
|---|---|---|---|---|---|
| Before hydrothermal synthesis | 1.89 | amorphous | 0.014 | 0.069 | 62 |
| 90° C. | 1.15 | 10 | 0.015 | 0.065 | 68 |
| 100° C. | 0.84 | 10 | 0.014 | 0.062 | 65 |
| 120° C. | 0.77 | 10 | 0.012 | 0.055 | 60 |

EXAMPLE 5

A zirconium oxide hydrate $ZrO_2 \cdot nH_2O$ and a SM-PES composed of a polyether sulfone introduced with sulfonic acid groups were used as a metal-oxide hydrate and an organic polymer, respectively. The organic polymer used herein had an ion exchange capacity per dry weight of 1.25 meq/g.

Initially, the zirconium oxide hydrate $ZrO_2 \cdot nH_2O$ was prepared by hydrothermal synthesis using zirconium oxychloride $ZrOCl_2 \cdot 8H_2O$ as a starting material by the procedure of a small particle diameter and thereby contributed to exhibit expected methanol blocking activities.

These results demonstrate that the composite electrolyte membranes containing dispersed $ZrO_2 \cdot nH_2O$ particles prepared by hydrothermal treatment at temperatures of 80° C. and 100° C. showed both high proton conductivity and low methanol permeability, as compared to the SM-PES single electrolyte membrane of Comparative Example 1. Accordingly, the MEAs using these composite electrolyte membranes showed higher maximum output densities than that of the SM-PES single electrolyte membrane of Comparative Example 1.

TABLE 2

| Hydrothermal treatment temperature | Number "n" of hydration water in $ZrO_2 \cdot nH_2O$ | Particle diameter of $ZrO_2 \cdot nH_2O$ (nm) | Proton conductivity of composite electrolyte membrane (S/cm) | Methanol permeability of composite electrolyte membrane (g · μm/min · cm$^2$) | Maximum output density of composite electrolyte membrane (mW/cm$^2$) |
|---|---|---|---|---|---|
| Before hydrothermal synthesis | 1.68 | amorphous | 0.018 | 0.055 | 65 |
| 80° C. | 3.22 | 3 | 0.035 | 0.035 | 82 |
| 100° C. | 5.59 | 1 | 0.037 | 0.026 | 85 |

EXAMPLE 6

A zirconium oxide hydrate $ZrO_2 \cdot nH_2O$ and a SM-PES composed of a polyether sulfone introduced with sulfonic acid groups were used as a metal-oxide hydrate and an organic polymer, respectively. The organic polymer used herein had an ion exchange capacity per dry weight of 1.25 meq/g.

Initially, the zirconium oxide hydrate $ZrO_2 \cdot nH_2O$ was prepared by hydrothermal synthesis using zirconium oxychloride $ZrOCl_2 \cdot 8H_2O$ as a starting material by the procedure of Example 5 using an aqueous ammonia solution as a flux agent, except for carrying out hydrothermal treatment at a temperature of 100° C. The prepared $ZrO_2 \cdot nH_2O$ particles had a particle diameter of 1 nm and a number of hydration water molecules of 5.59.

Using the $ZrO_2 \cdot nH_2O$ particles, a composite electrolyte membrane was prepared by the procedure of Example 4.

Using the composite electrolyte membrane, an MEA was prepared by the procedure of Example 1, except for forming catalyst layers 24 mm wide and 27 mm long. The MEA was assembled into a DMFC for PDA illustrated in FIG. 4. Using a 20 percent by weight aqueous methanol solution as a fuel, the output of the DMFC was measured and was found to have a maximum output of 2.2 W at room temperature.

EXAMPLE 7

In this example, a composite electrolyte membrane according to an embodiment of the present invention including a metal-oxide hydrate and an organic polymer was used in a PEFC. A zirconium oxide hydrate $ZrO_2 \cdot nH_2O$ and a SM-PES were used as the metal-oxide hydrate and the organic polymer, respectively. The organic polymer used herein had an ion exchange capacity per dry weight of 1.25 meq/g.

The zirconium oxide hydrate $ZrO_2 \cdot nH_2O$ was prepared by hydrothermal synthesis using zirconium oxychloride $ZrOCl_2 \cdot 8H_2O$ as a starting material by the procedure of Example 5 using an aqueous ammonia solution as a flux agent, except for carrying out hydrothermal treatment at a temperature of 100° C. The prepared $ZrO_2 \cdot nH_2O$ particles had a particle diameter of 1 nm and a number of hydration water molecules of 5.59.

Using the $ZrO_2 \cdot nH_2O$ particles, a composite electrolyte membrane was prepared by the procedure of Example 1, except for using the $ZrO_2 \cdot nH_2O$ particles in a content of 50 percent by weight.

Using the composite electrolyte membrane, an MEA for a PEFC was prepared in the following manner. A platinum-supporting carbon TEC10V50E supplied by Tanaka Kikinzoku Kogyo K.K. (supporting 50 percent by weight of platinum) was used both as a cathode catalyst and an anode catalyst. Water and a 5 percent by weight Nafion solution supplied by Sigma-Aldrich were mixed with the catalyst while stirring, to yield a catalyst slurry. The catalyst slurry for the cathode and anode was a 1:1:8.46 (by weight) mixture of TEC10V50E:water:(5 percent by weight Nafion solution). The catalyst slurry was applied to a polytetrafluoroethylene sheet using an applicator, to give a cathode catalyst layer and an anode catalyst layer. The cathode catalyst layer and anode catalyst layer were then thermally transferred to the composite electrolyte membrane prepared in this example by hot pressing and thereby yielded the MEA. The anode and cathode catalyst layers each contained 0.3 mg/cm$^2$ of platinum and had an area of 3 cm times 3 cm (9 cm$^2$).

The prepared MEA was assembled in a test cell illustrated in FIG. 2, and a current-voltage curve of the cell was measured. A hydrogen gas and air were used as reaction gases in the anode and cathode, respectively. These reaction gases were humidified by passing through a water bubbler at 90° C. at 1 atmospheric pressure, and the humidified hydrogen gas and air were then fed at flow rates of 50 ml/min and 200 ml/min, respectively, to the test cell at a temperature of 110° C.

A cell voltage was measured at a current density of 500 mA/cm$^2$ and was found to be 580 mV.

What is claimed is:

1. A composite electrolyte membrane for a fuel cell, comprising:
    a proton conductive zirconium oxide hydrate represented by $ZrO_2:nH_2O$; and
    a proton conductive organic polymer,
    wherein the zirconium oxide hydrate is in the form of particles having a particle diameter of 1 nm or more and 3 nm or less, and
    wherein the zirconium oxide hydrate contains 2.7 or more and 10 or less molecules of hydration water per one molecule of zirconium oxide.

2. The composite electrolyte membrane of claim 1, wherein the organic polymer is an aromatic hydrocarbon electrolyte.

3. The composite electrolyte membrane of claim 1, wherein the composite electrolyte membrane contains 5 to 80 percent by weight of the zirconium oxide hydrate as particles dispersed in the organic polymer.

4. A method of producing a composite electrolyte membrane for a fuel cell, the composite electrolyte membrane including a proton conductive zirconium oxide hydrate represented by $ZrO_2:nH_2O$ and a proton conductive organic polymer, the method comprising the steps of:
    preparing a reaction mixture by adding an aqueous solution including a starting material of the zirconium oxide hydrate $ZrO_2:nH_2O$ to an aqueous solution including a flux agent for promoting grain growth of the zirconium oxide hydrate $ZrO_2:nH_2O$;

preparing the zirconium oxide hydrate as particles by carrying out hydrothermal synthesis to the reaction mixture at temperatures of 80° C. to 300° C. under such conditions as to have a particle diameter of 1 nm or more and 3 nm or less and to contain 2.7 to 10 molecules of hydration water per one molecule of zirconium oxide;

dissolving the organic polymer in a solvent including a varnish;

mixing the particles of zirconium oxide hydrate with the varnish to give a mixture; and forming a membrane from the mixture.

5. A membrane electrode assembly comprising:

a cathode catalyst layer that reduces an oxidant gas;

an anode catalyst layer that oxidizes methanol; and the composite electrolyte membrane of claim 1 arranged between the cathode catalyst layer and the anode catalyst layer.

6. A direct methanol fuel cell comprising the membrane electrode assembly of claim 5.

7. A membrane electrode assembly comprising:

a cathode catalyst layer that reduces an oxidant gas;

an anode catalyst layer that oxidizes hydrogen; and the composite electrolyte membrane of claim 1 arranged between the cathode catalyst layer and the anode catalyst layer.

8. A polymer electrolyte fuel cell comprising the membrane electrode assembly of claim 7.

* * * * *